(12) United States Patent
Jee

(10) Patent No.: US 9,261,162 B2
(45) Date of Patent: Feb. 16, 2016

(54) DAMPING FORCE CONTROLLING VALVE ASSEMBLY FOR SHOCK ABSORBER

(75) Inventor: Young Whan Jee, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 751 days.

(21) Appl. No.: 13/291,671

(22) Filed: Nov. 8, 2011

(65) Prior Publication Data

US 2012/0112106 A1 May 10, 2012

(30) Foreign Application Priority Data

Nov. 8, 2010 (KR) ........................ 10-2010-0110557

(51) Int. Cl.
*F16F 9/46* (2006.01)

(52) U.S. Cl.
CPC ..................................... *F16F 9/464* (2013.01)

(58) Field of Classification Search
CPC ....................................................... F16F 9/464
USPC .............. 137/512.3, 516.23, 516.7, 854, 855, 137/857; 251/50; 188/322.13, 322.15
See application file for complete search history.

(56) References Cited

U.S. PATENT DOCUMENTS

| | | | | |
|---|---|---|---|---|
| 322,270 | A * | 7/1885 | Engel ............................. | 137/331 |
| 790,961 | A * | 5/1905 | Holtzmann .............. | 137/516.23 |
| 1,385,137 | A * | 7/1921 | Kauffmann .............. | 137/516.23 |
| 1,599,281 | A * | 9/1926 | Van Duzer .................... | 137/854 |
| 1,695,069 | A * | 12/1928 | Tuttle ........................ | 137/516.13 |
| 1,967,418 | A * | 7/1934 | McPhail .................. | 137/516.21 |
| 2,747,609 | A * | 5/1956 | Sekera ........................... | 137/560 |
| 4,821,852 | A * | 4/1989 | Yokoya ..................... | 188/322.15 |
| 4,854,341 | A * | 8/1989 | Bauer ............................ | 137/514 |
| 5,163,538 | A | 11/1992 | Derr et al. | |
| 5,518,089 | A * | 5/1996 | Handke et al. ............. | 188/266.6 |
| 5,586,627 | A | 12/1996 | Nezu et al. | |
| 5,601,112 | A * | 2/1997 | Sekiya et al. ............ | 137/512.15 |
| 5,960,915 | A * | 10/1999 | Nezu et al. ................. | 188/266.6 |
| 5,975,258 | A * | 11/1999 | Nezu et al. ............... | 188/322.15 |
| 6,035,979 | A * | 3/2000 | Forster ....................... | 188/266.6 |

(Continued)

FOREIGN PATENT DOCUMENTS

| | | |
|---|---|---|
| DE | 10 2006 016 473 A1 | 6/2007 |
| DE | 10 2009 002 582 A1 | 10/2010 |

(Continued)

OTHER PUBLICATIONS

German Office Action issued in corresponding German Patent Application No. 10 2011 117 971.6 mailed on Mar. 5, 2015; 5 pages in German language.

*Primary Examiner* — Craig Schneider
*Assistant Examiner* — Frederick D Soski
(74) *Attorney, Agent, or Firm* — McDermott Will & Emery LLP

(57) ABSTRACT

Provided is a damping force controlling valve assembly for a shock absorber using a solenoid part for variation of a damping force. The damping force controlling valve assembly includes: a first valve body having an inlet passage through which a working fluid flows in from the shock absorber; a second valve body coupled to the first valve body with a gap therebetween; a main valve disposed at the front of a back-pressure chamber to resist the working fluid flowing through the inlet passage; and a valve spring disposed in the gap between the first valve body and the second valve body and elastically supporting the main valve.

3 Claims, 3 Drawing Sheets

(56) References Cited

U.S. PATENT DOCUMENTS

| | | | |
|---|---|---|---|
| 6,079,526 A * | 6/2000 | Nezu et al. | 188/266.6 |
| 6,119,829 A * | 9/2000 | Nakadate | 188/266.6 |
| 6,182,805 B1 * | 2/2001 | Kashiwagi et al. | 188/266.6 |
| 7,896,311 B2 * | 3/2011 | Jee | 251/129.15 |
| 2003/0029684 A1 * | 2/2003 | Forster | 188/282.5 |
| 2008/0185245 A1 * | 8/2008 | Park | 188/322.15 |
| 2008/0190719 A1 * | 8/2008 | Jee | 188/322.13 |
| 2008/0251331 A1 * | 10/2008 | Mangelschots et al. | 188/266.6 |
| 2009/0020382 A1 * | 1/2009 | Van Weelden et al. | 188/282.2 |
| 2010/0001217 A1 * | 1/2010 | Jee et al. | 251/129.15 |
| 2010/0006383 A1 * | 1/2010 | Jee et al. | 188/322.13 |
| 2010/0044172 A1 * | 2/2010 | Jee et al. | 188/266.5 |

FOREIGN PATENT DOCUMENTS

| | | |
|---|---|---|
| DE | 10 2011 011 332 A1 | 8/2011 |
| JP | 1996-170679 | 7/1996 |
| KR | 10-2010-0007187 A | 1/2010 |
| KR | 10-2010-0023074 A | 3/2010 |

* cited by examiner

DAMPING FORCE CONTROLLING VALVE ASSEMBLY FOR SHOCK ABSORBER

CROSS-REFERENCE(S) TO RELATED APPLICATION

This application claims priority of Korean Patent Application No. 10-2010-0110557, filed on Nov. 8, 2010, in the Korean Intellectual Property Office, which is hereby incorporated by reference in its entirety.

BACKGROUND OF THE INVENTION

1. Field of the Invention

The present invention relates to a shock absorber for a vehicle, and more particularly, to a damping force controlling valve assembly that is disposed at one side of a shock absorber to control a damping force of the shock absorber.

2. Description of the Related Art

Generally, a shock absorber is an apparatus that absorbs sudden shock or vibration. For example, the shock absorber is applied to a vehicle to quickly absorb vibration of a spring generated by a road surface during driving of the vehicle, to secure the driving safety and provide an improved ride comfort.

During typical driving, the shock absorber reduces a damping force to absorb vibration caused by uneven road surfaces, leading to improvement in ride comfort. During turning, accelerating, braking, and high-speed driving, the shock absorber increases a damping force to control the position variation of a vehicle body, leading to improvement in handling stability.

Recent shock absorbers include a damping force controlling valve assembly at one side thereof to appropriately control the characteristics of the damping force, and have been developed to damping force variable shock absorbers that can appropriately control the characteristics of the damping force according to the conditions of driving and a road surface in order to improve ride comfort and handling stability.

Many efforts have been made to manufacture a shock absorber having excellent damping force control characteristics by improving the performance of a damping force controlling valve assembly. Korean Patent Laid-Open Publication Nos. 2010-0023074 and 2010-0007187 disclose technologies of damping force controlling valve assemblies that have been recently developed for shock absorbers. Particularly, attempts to secure ride comfort of vehicles by reducing a damping force at a low or high speed have been to improve the performance of a damping force controlling valve assembly of a shock absorber.

A typical damping force controlling valve assembly employs a method of pushing and supporting a portion around the inner diameters of a main valve, i.e., valve disks with a stepped difference of a retainer. However, in such a method, a force of working fluids for opening the valve disks and moving forward is more significantly generated at a higher speed. Therefore, degressive characteristics could not be shown. This results from a limitation in the magnitude of an elastic modulus in the case of a disk-type main valve.

SUMMARY OF THE INVENTION

An aspect of the present invention is directed to a damping force controlling valve assembly, which can reduce a low or high speed damping force and thus improve the ride comfort of vehicles, by applying a spring support structure to a main valve in the damping force controlling valve assembly.

Another aspect of the present invention is directed to a damping force controlling valve assembly for a shock absorber, which can increase an amount of compression against a working fluid, increase an initial load, and can further implement degressive damping characteristics, by allowing a main valve to be supported by a valve spring having a low spring constant.

According to an embodiment of the present invention, a damping force controlling valve assembly for a shock absorber using a solenoid part for variation of a damping force includes: a first valve body having an inlet passage through which a working fluid flows in from the shock absorber; a second valve body coupled to the first valve body with a gap therebetween; a main valve disposed at the front of a back-pressure chamber to resist the working fluid flowing through the inlet passage; and a valve spring disposed in the gap between the first valve body and the second valve body and elastically supporting the main valve.

The valve spring may include a circular valve core at one end thereof that contacts the main valve.

The damping force controlling valve assembly may further include a spool operation part that supplies the working fluid into the back-pressure chamber according to control of the solenoid part. The spool operation part may be disposed to penetrate through the center of the first valve body and the second valve body. A sealing disk may be connected between the valve core and the spool operation part.

The damping force controlling valve assembly may further include a base retainer coupled to an upper portion of the solenoid part. The second valve body may be detachably coupled to the base retainer while being coupled to the first valve body. The first valve body and the second valve body may be disposed such that an inner wall of the second valve body contacts an outer wall of the first valve body. The second valve body may include an extension part that extends and passes by the outer wall of the first valve body. Also, the extension part of the second valve body may be bent to cover an outer edge of the first valve body.

REFERENCE NUMERALS

Figure 1:
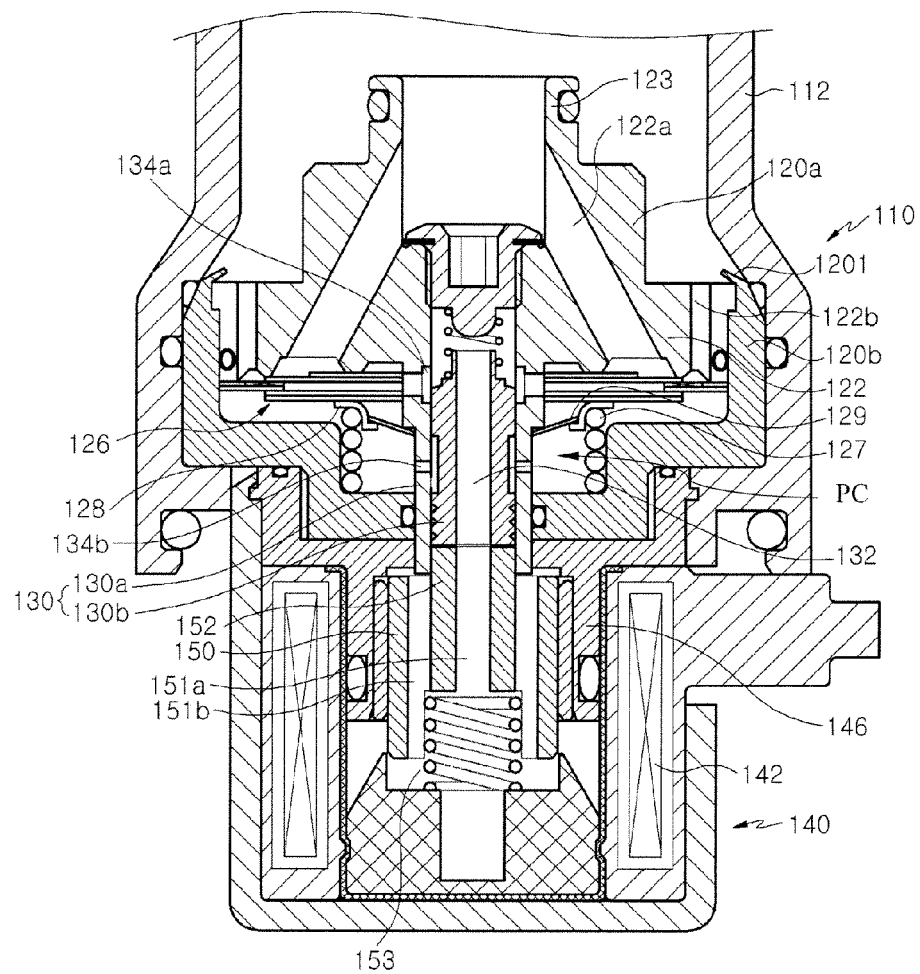
FIG. 1 is a cross-sectional view illustrating a damping force controlling valve assembly for a shock absorber according to an embodiment of the present invention.

| 120a: first valve body | 120b: second valve body |
|---|---|
| 122a: inlet passage | 126: main valve |
| 127: valve spring | 128: valve core |
| 129: sealing disk | |

DETAILED DESCRIPTION OF EXEMPLARY EMBODIMENTS

Exemplary embodiments of the present invention will be described below in detail with reference to the accompanying drawings. Throughout the disclosure, like reference numerals refer to like parts throughout the drawings and embodiments of the present invention.

FIG. 1 is a cross-sectional view illustrating a damping force controlling valve assembly for a shock absorber according to an embodiment of the present invention.

Referring to FIG. 1, a damping force controlling valve assembly 110 is disposed at one side of a shock absorber (not shown). The shock absorber includes a cylinder and a reservoir chamber that communicates with the cylinder. A high pressure side connected to a tensioning chamber of the cylinder and a low pressure side connected to the reservoir chamber are connected to the damping force controlling valve assembly 110.

The damping force controlling valve assembly 110 includes first and second valve bodies 120a and 120b disposed inside a valve housing 112, a main valve 126, a solenoid part 140, and a spool operation part 130. These elements constitute various upper parts of the valve assembly 110. The upper parts of the valve assembly 110 are connected to the solenoid part 140 by the medium of a base retainer 146.

The spool operation part 130 operates according to the control of the solenoid part 140, and varies the damping force by the main valve 126. The spool operation part 130 is fixedly disposed through the center of the first and second valve bodies 120a and 120b. The spool operation part 130 includes a spool rod part 130a and a spool 130b. The spool rod part 130a and the spool 130b cooperate with each other to vary the damping force while varying in their relative locations according to the control of the solenoid part 140.

The first valve body 120a is connected to the high pressure side at the central portion, and an outer diameter of the first valve body 120a increases toward the outside. To this end, a connection port 123 connected to a high pressure chamber of the shock absorber is disposed at the upper portion of the first valve body 120a. In addition, an inlet passage 122a connected to the connection port 123 penetrates through the first valve body 120a. The inlet passage 122a inclines toward the outside along the shape of the first valve body 120a to exhaust a working fluid passing through the inlet passage 122a to the lower side of the first valve body 120a.

The second valve body 120b is disposed under the first valve body 120a to form a gap therebetween. As will be described below, the main valve 126 and a valve spring 127 for supporting the main valve 126 are disposed in the gap.

In this embodiment, the first valve body 120a is coupled to the second valve body 120b such that the inner wall of the second valve body 120b contacts the outer wall of the first valve body 120a. The second valve body 120b includes an extension part 1201 that extends and passes by the outer wall of the first valve body 120a. The extension part 1201 of the second valve body 120b is bent through cocking or curling to surround the outer edge of the first valve body 120a. The coupling method of the first and second valve bodies 120a and 120b using cocking or curling increases the durability and the structural reliability of the damping force controlling valve assembly.

As described above, the base retainer 146 is disposed over the solenoid part 140, and the second valve body 120b is easily detachably coupled to the base retainer 146 while being coupled to the first valve body 120a. In the related art, since a solenoid part and a retainer at the side of a valve are integrally formed, they have to be discarded when a failure occurs on a damping force controlling valve assembly. In this embodiment, due to the above detachable structure, the solenoid part may be recycled, and only other parts of a valve side may be discarded, achieving an economical advantage.

On the other hand, the spool rod part 130a is integrally formed with the first and second valve bodies 120a and 120b while passing through the center of the first and second valve bodies 120a and 120b. In addition, a hollow, through which the spool 130b is inserted, is formed in the central portion of the spool rod part 130a. A plurality of connection ports 134a and 134b are formed in the spool rod part 130a to allow fluid to pass through. The upper connection port 134a among the plurality of connection ports guides a working fluid flowing in from the inlet passage 122a to the inside of the spool rod part 130a. The lower connection port 134b among the plurality of connection ports supplies a working fluid into a back-pressure chamber PC at the rear of the main valve 126. The open/close pressure of the main valve 126 is controlled by the fluid supplied into the back-pressure chamber PC. The solenoid part 140, which will be described in more detail below, drives the spool pressurizing part 150 to displace the spool 130b. Thus, a working fluid supplied to the back-pressure chamber PC is controlled through relative location variation of the spool rod part 130a and the spool 130b and a control of the connection port 134b. Accordingly, the pressure of the back-pressure chamber PC and the damping force by the main valve 126 can be controlled.

The main valve 126 is disposed to cover the inlet passage 122a at the rear of the first valve body 120a and generate a damping force by directly resisting a working fluid passing through the inlet passage 122a. That is, the main valve 126 resists a working fluid flowing through the inlet passage 122a, and simultaneously allows the working fluid to flow into the outlet passage 122b while being bent back.

In addition, an inner slit is formed at the inner side of the main valve 126 to allow a part of working fluid passing through the inlet passage 122a to flow in a direction other than the outlet passage 122b. The inner slit communicates with the connection port at ordinary times. Also, an outer slit is formed at the outer side of the main valve 126. The outer slit communicates with the outlet passage 122b at ordinary times. The outlet passage 122b is formed in the first valve body 120a to exhaust the supplied fluid to a low pressure side by allowing the main valve 126 to be bent back according to the pressure of the back-pressure chamber PC.

The main valve 126 includes a plurality of valve disks that are stacked. The valve disks generate a damping force while resisting the working fluid. Unlike a related art where disks of a main valve are pushed by a stepped difference of a retainer to be supported, the main valve 126 including valve disks is elastically supported by the valve spring 127. The valve spring 127 is disposed in a gap between the first valve body 120a and the second valve body 120b. The lower end of the valve spring 127 is supported by the bottom of the second valve body 120b, and the upper end of the valve spring 127 supports the disks of the main valves 126. Particularly, the valve spring 127 includes a circular main valve core 128 at the upper end thereof that contacts the lowermost layer of the valve disk of the main valve 126. Substantially, the valve core 128 contacts a lower portion of the main valve 126.

A sealing disk 129 is connected between the valve core 128 and the spool rod part 130a of the spool operation part 130. A back-pressure chamber PC may be formed by the disks of the main valve 126, particularly, circular plate disk, disk ring, and sealing disk 129.

The solenoid part 140 is detachably coupled to the lower end of the valve housing 112, the upper end of which is coupled to the outer side of the shock absorber. Also, the solenoid part 140 includes a bobbin 142 on which coil is wound to generate a magnetic force according to a variation of an electric current, and a spool pressurizing part 150 disposed to be movable according to variation of an electric current supplied to the coil wound on the bobbin 142.

Also, a block-type base retainer 146 is disposed over the solenoid part 140 to guide the spool pressurizing part 150 and finish the upper portion of the solenoid part 140.

The spool pressurizing part 150 has a cylindrical shape. A rising part 152 contacting the spool 130b is formed in the center of the spool pressurizing part 150. The rising part 152 is partially inserted into the hollow of the spool rod part 130a. Also, the rising part 152 moves the spool pressurizing part 150 by an electric current applied to the solenoid part 140, and the spool 130b is moved while interworking with the rising part 152.

The spool 130b has a hollow flow passage 132 that penetrates through the central portion thereof. Accordingly, the working fluid is moved by a pressure difference generated during movement of the spool 130b, and thus, the pressure difference is offset.

The spool pressurizing part 150 has a first flow passage 151a and a second flow passage 151b. The first flow passage 151a penetrates through the center of the rising part 152 and communicates with the hollow flow passage 132. The second flow passage 151b is formed around the rising part 152. Accordingly, a working fluid passing through the spool 130 is exhausted to the flow passage 153 of the spool pressurizing part 150 and the first and second flow passages 151a and 151b, and offsets a back-pressure difference according to the movement of the spool pressurizing part 150. Accordingly, vibration may not be generated during the movement of the spool pressurizing part 150, and the spool 130a contacting the spool pressurizing part 150 may be moved without vibration.

Figure 2:
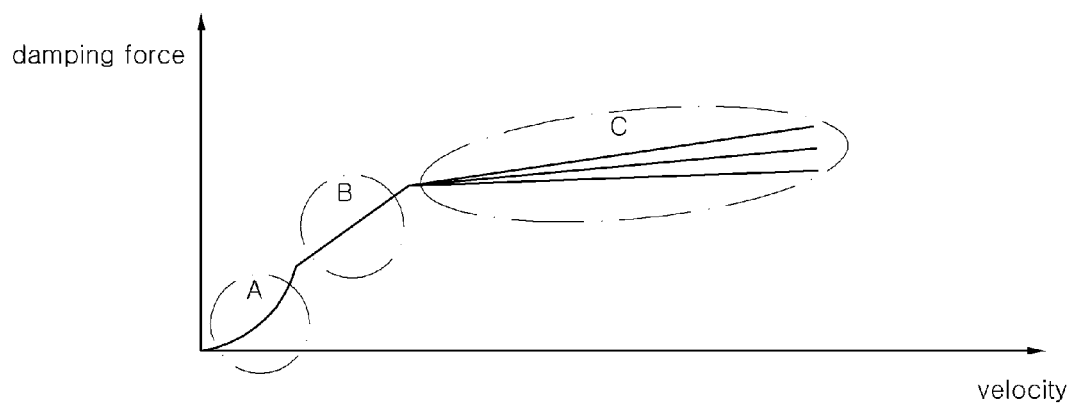
FIG. 2 is a graph illustrating a damping force curve obtained using a damping force controlling valve assembly according to an embodiment of the present invention.

FIG. 2 is a graph illustrating a damping force curve obtained using a damping force controlling valve assembly according to an embodiment of the present invention.

Referring to FIGS. 1 and 2, the slit provided in the main valve 126 mainly involves in generating a damping force in the range A of FIG. 2, i.e., the low speed range. The tuning of the damping force can be performed using the size of the slit. In the range B of FIG. 2, i.e., the middle speed range, disks of the main valve 126 are opened, which is called blow-off. The disks mainly involve in generating the damping force. In this range, the tuning of the damping force may be performed by adjusting the number and the thickness of the disks. In the range C of FIG. 2, i.e., the high speed range, while the valve spring 127 is compressed due to an increasing amount of fluid, a secondary blow-off occurs. In this range, the gradient of the curve may vary according to the elastic modulus K of the valve spring 127.

Referring to FIG. 1, when the outer circumference of the valve core 128 on the valve spring 127 varies, the support point of the main valve 126 may vary. When a solid core is used, it is difficult to change the support point, but it is easy to change the support point of the main valve 126 and thus tune the damping force by using the valve core 128 that can vary in its outer diameter. Also, as a method of adjusting the load of the valve spring 127 described above, a spring load can be adjusted by adding or omitting a retainer at an upper or lower portion of the spring 127 when the pressure varies according to an initial spring load.

In a related art, when the housing of a solenoid part is formed integrally with a retainer of a valve side, and a failure occurs after fabrication, all have to be discarded. However, in this embodiment, when the second valve body is detachably coupled to the base retainer of the solenoid part, only the valve assembly is discarded, and the solenoid part can be recycled. Also, there is an advantage in that a test can be performed by installing a solenoid part for test in an electric current and pressure (i-p) test apparatus and fabricating a valve assembly thereon.

Figure 3:
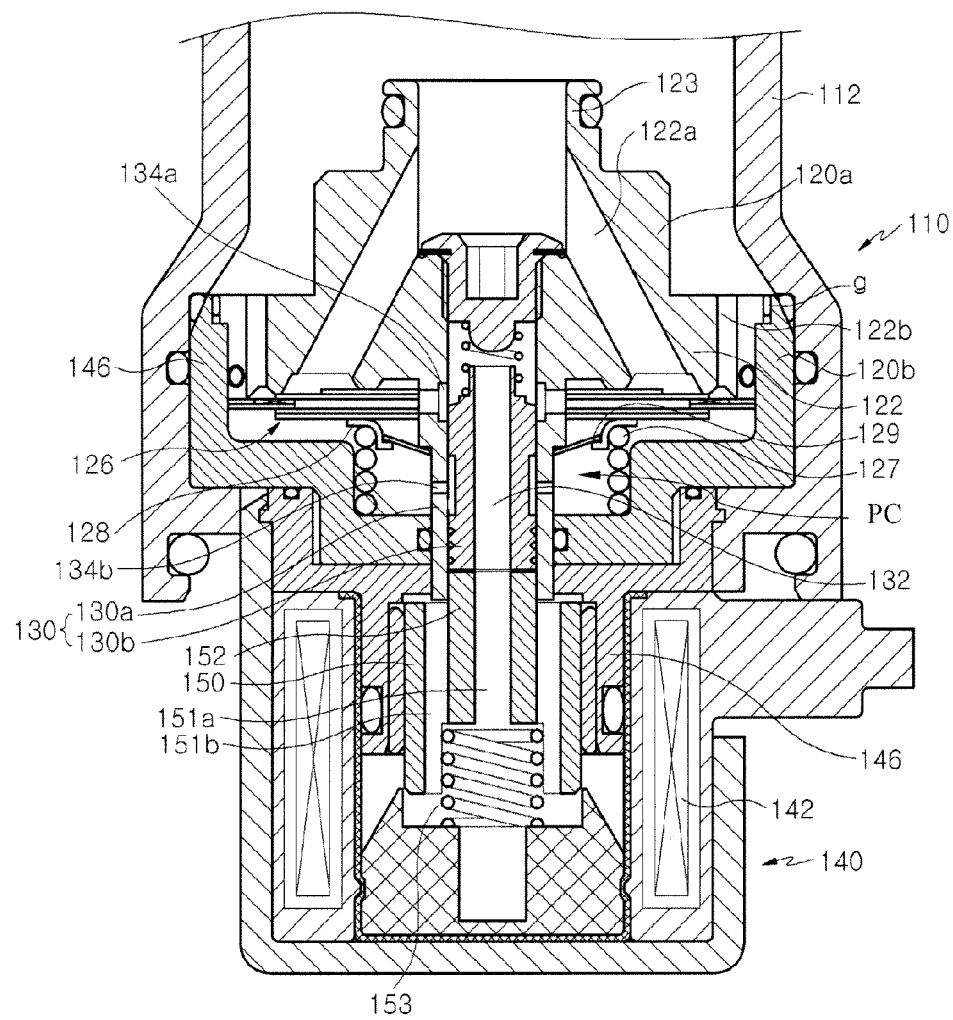
FIG. 3 is a cross-sectional view illustrating a damping force controlling valve assembly for a shock absorber according to another embodiment of the present invention.

FIG. 3 is a cross-sectional view illustrating a damping force controlling valve assembly for a shock absorber according to another embodiment of the present invention. Referring to FIG. 3, screw coupling may be used instead of cocking or curling of the previous embodiment when a first valve body 120a and a second valve body 120b are coupled to each other. Also, only the valve spring 127 and/or parts associated therewith among a damping force controlling valve assembly according to a related art may be replaced.

In a damping force controlling valve assembly for a shock absorber according to an embodiment of the present invention, a main valve including one or more valve disks may be supported by a valve spring. Accordingly, when a valve spring having a low spring coefficient is used, the load can increase, while the elastic modulus can be reduced. Thus, the low and high speed damping force can be lowered to improve the ride comfort. Also, since the distribution is low with the use of one spring, the reliability and performance of a solenoid valve assembly can be expected to be improved. Additionally, since a position where a main valve is supported by the valve spring and the elastic modulus of the valve spring can be controlled, the degree of freedom of damping force tuning can be increased.

While the embodiments of the present invention has been described with reference to the specific embodiments, it will be apparent to those skilled in the art that various changes and modifications may be made without departing from the spirit and scope of the invention as defined in the following claims.

What is claimed is:

1. A damping force controlling valve assembly for a shock absorber using a solenoid part for variation of a damping force, comprising:
    a first valve body having an inlet passage through which a working fluid flows in from the valve assembly;
    a second valve body coupled to the first valve body with a gap therebetween;
    a main valve disposed between the inlet passage and a back-pressure chamber to resist the working fluid flowing through the inlet passage, and the main valve including one or more valve disks;
    a valve spring disposed in the gap between the first valve body and the second valve body and elastically supporting the one or more valve disks of the main valve, and ends of the valve spring being mounted to the second valve body and the main valve, respectively, to connect the one or more valve disks with the second valve body;
    a spool operation part penetrating through the center of the first valve body and the second valve body; and
    a base retainer having a protrusion which protrudes from an upper outer surface thereof to be fitted onto a groove formed at an upper portion of the solenoid part, so that the second valve body is detachably coupled to the base retainer while being coupled to the first valve body,
    wherein the valve spring comprises: a circular valve core at one end thereof that contacts the main valve; and a sealing disk connected between the circular valve core and the spool operation part.

2. The damping force controlling valve assembly according to claim 1, wherein the spool operation part supplies the working fluid into the back-pressure chamber according to control of the solenoid part.

3. The damping force controlling valve assembly according to claim 1, wherein:

the first valve body and the second valve body are disposed such that an inner wall of the second valve body contacts an outer wall of the first valve body;

the second valve body comprises an extension part that extends and passes by the outer wall of the first valve body; and the extension part of the second valve body is bent to cover an outer edge of the first valve body.

\* \* \* \* \*